United States Patent [19]
Rajagopalan et al.

[11] Patent Number: 5,981,658
[45] Date of Patent: *Nov. 9, 1999

[54] GOLF BALL INCORPORATING GRAFTED METALLOCENE CATALYZED POLYMER BLENDS

[75] Inventors: Murali Rajagopalan, South Dartmouth; Kevin M. Harris, New Bedford, both of Mass.

[73] Assignee: Acushnet Company, Fairhaven, Mass.

[ * ] Notice: This patent is subject to a terminal disclaimer.

[21] Appl. No.: 08/950,197

[22] Filed: Oct. 14, 1997

Related U.S. Application Data

[63] Continuation-in-part of application No. 08/658,338, Jun. 5, 1996, Pat. No. 5,824,746, which is a continuation-in-part of application No. 08/482,514, Jun. 7, 1995, Pat. No. 5,703,166, which is a continuation-in-part of application No. 08/377,553, Jan. 24, 1995, abandoned.

[51] Int. Cl.$^6$ ............................ A63B 37/12; A63B 37/02; A63B 37/04
[52] U.S. Cl. .................... 525/72; 525/74; 525/221; 521/134; 473/354; 473/355; 473/357; 473/365; 473/373; 473/374; 473/378; 473/385
[58] Field of Search ................ 525/74, 221, 72; 473/354, 355, 357, 365, 378, 385, 373, 374; 521/134

[56] References Cited

U.S. PATENT DOCUMENTS

| | | | |
|---|---|---|---|
| 4,274,637 | 6/1981 | Molitor | 273/235 |
| 4,781,383 | 11/1988 | Kamada et al. | 273/228 |
| 4,986,545 | 1/1991 | Sullivan | 273/235 |
| 5,002,281 | 3/1991 | Nakahara et al. | 273/220 |
| 5,098,105 | 3/1992 | Sullivan | 273/235 |
| 5,106,916 | 4/1992 | Mitchell | 525/255 |
| 5,187,013 | 2/1993 | Sullivan | 428/407 |
| 5,330,837 | 7/1994 | Sullivan | 428/407 |
| 5,338,610 | 8/1994 | Sullivan | 428/407 |
| 5,346,963 | 9/1994 | Hughes | 525/285 |
| 5,397,840 | 3/1995 | Sullivan et al. | 525/221 |
| 5,824,746 | 10/1998 | Harris | 525/221 |
| 5,830,087 | 11/1998 | Sullivan | 473/385 |

FOREIGN PATENT DOCUMENTS

| | | |
|---|---|---|
| 0 266 994 A2 | 5/1988 | European Pat. Off. . |
| 0 633 043 B1 | 1/1995 | European Pat. Off. . |

*Primary Examiner*—David Buttner
*Attorney, Agent, or Firm*—Pennie & Edmonds LLP

[57] ABSTRACT

The disclosed invention provides novel golf ball compositions which contain non-ionic olefinic copolymers produced by use of metallocene catalysts, wherein the metallocene catalyzed polymers have been functionalized with a post-polymerization reaction. The grafted metallocene catalyzed polymers may be blended with ionomers, non-grafted metallocene catalyzed polymers, or other non-ionomeric polymers. These compositions exhibit improved mechanical properties such as tensile and flexural properties, and can be foamed or unfoamed. Golf balls that employ at least one layer of these compositions in any of the golf ball cover, core, or a mantle situated between the cover and the core provide ball properties and performance similar to and in some cases better than the state of the art ionomer based golf balls.

33 Claims, 3 Drawing Sheets

GOLF BALL INCORPORATING GRAFTED METALLOCENE CATALYZED POLYMER BLENDS

This application is a continuation-in-part of U.S. application Ser. No. 08/658,338, filed on Jun. 5, 1996 now U.S. Pat. No. 5,824,746, which is a continuation-in-part of U.S. application Ser. No. 08/482,514, filed on Jun. 7, 1995 now U.S. Pat. No. 5,703,166, which is a continuation-in-part of U.S. application Ser. No. 08/377,553 filed Jan. 24, 1995 (now abandoned).

FIELD OF THE INVENTION

The present invention relates to golf balls and, in particular, to golf balls having at least one layer comprising at least one olefinic polymer produced using a single-site metallocene catalyst in the polymerization process, to which at least one pendant functional group has been grafted by a post-polymerization reaction. The grafted metallocene catalyzed polymer may be mixed with at least one of an ionomer, a non-grafted or unfunctionalized metallocene catalyzed polymer, or other non-ionomeric polymer to form a blend, and may be foamed or unfoamed. The layer may be located in any of the cover or core of the ball or in a mantle layer located between the cover and the core.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. For example, U.S. Pat. No. 4,274,637 to Molitor discloses two- and three-piece golf balls having covers completely or partially formed from a cellular polymeric material to improve backspin, but does not provide any examples that compare the spin rates of the disclosed golf balls with those of prior art balls.

U.S. Pat. No. 5,002,281 to Nakahara et al. discloses a three-piece solid golf ball having an ionomer cover and a solid core consisting of a soft inner core and a hard outer shell, where the difference in the hardness of the two parts of the core is at least 10 on the JIS-C scale.

Similarly, U.S. Pat. No. 4,781,383 discloses a solid, three-piece golf ball, having an ionomer cover and a core with inner and outer layers, where the inner layer has a diameter of 24 to 29 mm and a Shore D hardness of 15 to 30, and the outer layer has a diameter of 36 to 41 and a Shore D hardness of 55 to 65. The percentage of the ball surface which contacts the club face when the ball is struck is 27 to 35%.

European Patent Application 0 633 043 discloses a solid, three-piece golf ball with an ionomer or balata cover, a center core, and an intermediate layer. The center core has a diameter of at least 29 mm and a specific gravity of less than 1.4. The intermediate layer has a thickness of at least 1 mm, a specific gravity of less than 1.2, and a hardness of at least 85 on the JIS-C scale.

Copending application Ser. No. 08/482,518 now U.S. Pat. No. 5,688,192 employs compressible materials, i.e., gases, in the core of a solid construction golf ball to simulate the effects of trapped air in a wound ball.

None of these disclosures utilizes the unique physical properties of metallocene catalyzed polymers, i.e., polymers produced using single-site metallocene catalysts, which produce polymers with a narrow molecular weight distribution and uniform molecular architecture, so that the order and orientation of the monomers in the polymer, and the amount and type of branching is essentially the same in each polymer chain.

The narrow molecular weight distribution and uniform molecular architecture provides metallocene catalyzed polymers with properties that are not available with conventional polymers, and allow polymers to be produced having unique properties that are specifically tailored to a particular application. The desired molecular weight distribution and the molecular architecture are obtained by the selection of the appropriate metallocene catalyst and polymerization conditions.

Processes for grafting monomers onto polymers and, in particular, polyolefins, are known. European Patent Application No. 0 266 994 of P. C. Wong discloses a process for grafting ethylenically unsaturated monomers, such as unsaturated carboxylic acids and anhydrides and derivatives thereof, onto copolymers of ethylene. The disclosed process comprises the steps of forming an admixture of the copolymer, monomer, and 25 to 3,000 ppm of an organic peroxide having a half-life of about one minute to about 120 minutes at 150° C., and mixing the resultant admixture in an extruder at a temperature above the melting point of the copolymer for a period of time at least four times the half-life of the organic peroxide. The resultant grafted copolymer is then extruded into a shaped article.

U.S. Pat. No. 5,106,916 to Mitchell discloses a process for the catalytic grafting of an ethylenically unsaturated monomer onto a copolymer in which the process of EPA 0 266 994 is modified by the addition of a catalyst comprising water and at least one phosphorous-containing compound selected from the group consisting of compounds of formula HPO$(OR_1)_2$, phosphite compounds of formula $P(OR_2)_3$ and formula $(OR_3)P$—O—$R_4$—O—$P(OR_5)_2$, and disubstituted pentaerythritol diphosphites of formula $(R_6O)P$—$O_2$—$R_{PE}O_2$—$P(OR_7)$, where $O_2R_{PE}O_2$ is the pentaerythritol moiety, and $R_1$–$R_7$ are specified organic functional groups.

Grafted metallocene catalyzed polymers, which are available commercially, share the advantages of non-grafted metallocene catalyzed polymers, including a narrow molecular weight distribution and uniform molecular architecture. The addition of functional groups to the metallocene catalyzed polymers by grafting allows polymers to be produced having properties that are not available with unfunctionalized metallocene catalyzed polymers or polymers formed without the use of metallocene catalysts.

While different blend combinations of species of one variety of polymer, such as ionomers, have been successfully used in the prior art, different polymers, such as ionomers and balata or other non-ionic polymers have not been successfully blended for use in golf ball covers. In general, prior art blends of polymer components are immiscible, i.e., heterogeneous on a microscopic scale, and incompatible, i.e., heterogeneous on a macroscopic scale, unless strong interactions are present between the polymer components in the mixture, such as those observed between ionomers and polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and so on. In contrast, a compatible blend may be heterogeneous on a microscopic scale, but is homogeneous on a macroscopic scale, and, thus, has useful golf ball properties.

In this regard, U.S. Pat. No. 5,397,840 to Sullivan discloses golf ball covers including a blend of "ionic copolymers" and "non-ionic copolymers". However, the "ionic copolymers" are defined as copolymers of an α-olefin and a metal salt of an α,β-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or nonpolar, in particular, those polymers produced with a process that does not involve the use of a metallocene catalyst.

U.S. Pat. Nos. 4,986,545; 5,098,105; 5,187,013; 5,330,837; and 5,338,610 to Sullivan disclose golf balls having covers comprising blends of ionomers and modified thermoplastic elastomers, where the thermoplastic elastomers are conventional polymers, i.e., polymers polymerized using catalysts other than metallocene catalysts. The modified polymers include maleic anhydride modified ethylene-propylene copolymers, maleic anhydride modified styrenic block copolymers, maleic anhydride modified ethylene-vinyl acetate copolymers, brominated styrene-isobutylene copolymers, amine modified ethylene-propylene rubber, and polar modified paramethylstyrene-isobutylene copolymers. However, blends of ionomers with modified polyolefins are not exemplified. Although the disclosed balls are said to exhibit enhanced playability, i.e., softness and spin, without sacrificing coefficient of restitution and, thus, carrying distance, all of the exemplified balls have a Riehle Compression in the range of 61 to 43, which corresponds to a PGA Compression range of from 99 to 117. Therefore, even though the disclosed cover materials may be relatively soft, each of the disclosed balls has an extremely high compression, and, thus, would be expected to have a high coefficient of restitution.

As shown in co-pending patent application Ser. No. 08/482,514, metallocene catalyzed polymers and ionomers form compatible blends of useful golf ball properties. However, there is no known prior art disclosure of golf balls incorporating compositions comprising grafted metallocene catalyzed polymers.

Therefore, there is a need in the golf ball art for a golf ball incorporating grafted metallocene catalyzed polymers and blends of grafted metallocene catalyzed polymers and other polymers, such as ionomers, in golf balls. The inclusion of foamed and unfoamed grafted metallocene catalyzed polymers and grafted metallocene catalyzed polymer blends will allow highly durable golf balls to be produced with improved performance and virtually any combination of feel and spin rate.

SUMMARY OF THE INVENTION

The present invention is directed to golf balls having at least one foamed or unfoamed layer in at least one of the cover, the core, or in one or more intermediate mantles between the cover and the core, where the layer is formed from a composition comprising at least one metallocene catalyzed polymer that has been functionalized by sulfonation, carboxylation, addition of an amine or hydroxy, or by grafting an ethylenically unsaturated monomer onto the at least one metallocene catalyzed polymer using a post-polymerization reaction. The ethylenically unsaturated monomer is typically an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids and ionomeric derivatives thereof. Preferably, the ethylenically unsaturated monomer is maleic anhydride.

The golf ball compositions of the invention may comprise a blend of at least one grafted metallocene catalyzed polymer and at least one of an ionomer, a non-grafted, i.e., unfunctionaized, metallocene catalyzed polymer, or a non-ionomeric polymer. Preferably, the composition is a blend of at least one grafted metallocene catalyzed polymer and at least one ionomer, and comprises from about 5 to about 90 phr of at least one grafted metallocene catalyzed polymer and about 95 to about 10 phr of at least one ionomer, more preferably from about 10 to about 75 phr of at least one grafted metallocene catalyzed polymer and about 90 to about 25 phr of at least one ionomer, and most preferably from about 10 to about 50 phr of at least one grafted metallocene catalyzed polymer and about 90 to about 50 phr of at least one ionomer. Typically, the layer has a Shore D hardness of from about 15 to about 80 and a thickness of from about 0.005 to about 0.125 inch, and the core has a diameter of from about 1.0 to about 1.63 inch. In addition, a typical grafted metallocene catalyzed polymer has a flexural modulus of from about 500 psi to 200,000 psi, preferably from about 1,000 to about 150,000 psi and the ionomer has a flexural modulus of from about 50 psi to about 150,000 psi. Any of the cover, the core, or a mantle between the cover and the core may further comprise a density increasing filler material.

Preferably, the grafted metallocene catalyzed polymer is formed by grafting an ethylenically unsaturated monomer onto a metallocene catalyzed polymer selected from the group consisting of polyethylene and copolymers of ethylene with propylene, butene, pentene, hexene, heptene, octene, and norbornene, most preferably, copolymers of ethylene with butene, pentene, hexene, heptene, octene, and norbornene, but may be formed by grafting an ethylenically unsaturated monomer onto any metallocene catalyzed polymer of the formula:

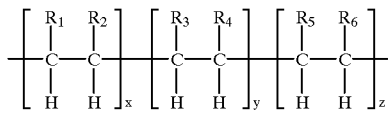

wherein $R_1$ is hydrogen;

$R_2$ is hydrogen or lower alkyl selected from the group consisting of $CH_3$, $C_2H_5$, $C_3H_7$, $C_4H_9$, and $C_5H_{11}$;

$R_3$ is hydrogen or lower alkyl selected from the group consisting of $CH_3$, $C_2H_5$, $C_3H_7$, $C_4H_9$, and $C_5H_{11}$;

$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x ranges from 99 to 50 weight percent of the polymer, y ranges from 1 to 50 weight percent of the polymer and z ranges from 0 to 49 weight percent of the polymer.

DETAILED DESCRIPTION OF THE PREFERRED EMBODIMENTS OF THE INVENTION

Figure 1:
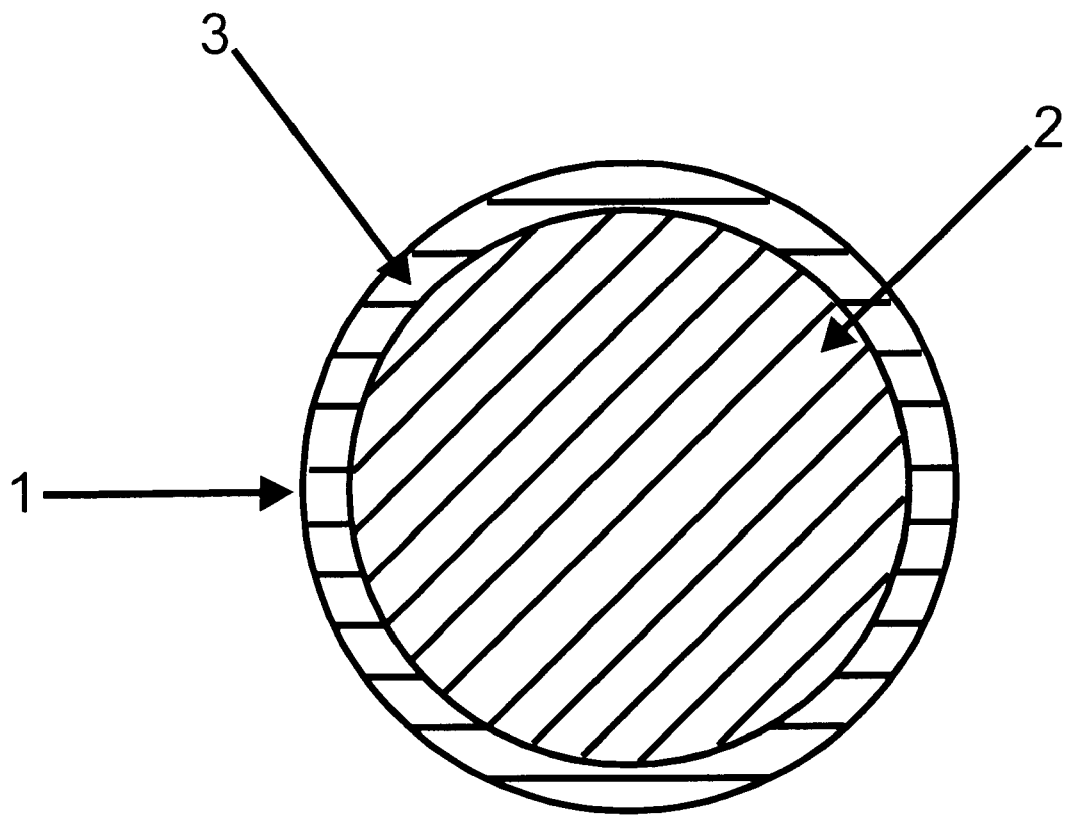
FIG. 1 is a cross-sectional view of a two-piece golf ball according to the invention with a one-piece core.

As used herein, the term "metallocene catalyzed polymer" refers to any polymer, copolymer, or terpolymer, and, in particular, any polyolefin, polymerized using a metallocene catalyst. The term "metallocene catalyzed polymer blend" refers to any blend of a metallocene catalyzed polymer and any other type of polymer, preferably an ionomer.

The terms "grafted metallocene catalyzed polymer" and "grafted metallocene catalyzed polymer blend" refer to any metallocene catalyzed polymer or metallocene catalyzed polymer blend in which the metallocene catalyzed polymer has been subjected to a post-polymerization reaction to graft at least one functional group onto the metallocene catalyzed polymer. A "post-polymerization reaction" is any reaction that occurs after the formation of the polymer by polymerization.

As used herein, the term "layer" includes any generally spherical portion of a golf ball or golf ball core, center, or mantle, including one-piece cores and one-piece balls. A "mantle" is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein.

In addition, as used herein, the term "compatible" with regard to a polymer blend refers to a blend of two or more polymers, having useful golf ball properties, that is homogeneous on a macroscopic scale. Compatible blends may be miscible, i.e., homogeneous on a microscopic scale, or at least partially immiscible, i.e., heterogeneous on a microscopic scale. The term "incompatible" refers to a mixture of at least two polymers that is heterogeneous on both a microscopic scale and a macroscopic scale, such that useful golf ball properties, such as durability, are lacking.

The present invention relates to golf balls including at least one foamed or unfoamed layer that comprises one or more grafted metallocene catalyzed polymers. As noted above, the layer may be in any of the core, the cover, or a mantle layer situated between the cover and the core. The grafted metallocene catalyzed polymer may be blended with other types of polymers, such as non-grafted metallocene catalyzed polymers, ionomers, and thermoplastic elastomers. Preferably, the grafted metallocene catalyzed polymer is blended with at least one ionomer.

Grafted metallocene catalyzed polymer blends useful in the invention typically comprise a compatible blend of about 1 to 100 phr of at least one grafted metallocene catalyzed polymer and about 99 to 0 phr of at least one ionomer, preferably from about 5 to about 90 phr of at least one grafted metallocene catalyzed polymer and about 95 to about 10 phr of at least one ionomer, more preferably from about 10 to about 75 phr of at least one grafted metallocene catalyzed polymer and about 90 to about 25 phr of at least one ionomer, and most preferably from about 10 to about 50 phr of at least one grafted metallocene catalyzed polymer and about 90 to about 50 phr of at least one ionomer. Where the layer is foamed, the grafted metallocene catalyzed polymer blends may be foamed during molding by any conventional foaming or blowing agent.

Grafted metallocene catalyzed polymers and polymer blends may be thermoformed, and, thus, can be either compression or injection molded to form a layer of foamed or unfoamed grafted metallocene catalyzed polymer in the cover, core, or mantle of a golf ball according to the invention. Grafted metallocene catalyzed polymers and grafted metallocene catalyzed polymer blends are resilient, easily processed materials that are less expensive than ionomers, and allow highly durable golf balls to be produced with improved performance and virtually any combination of feel and spin rate.

Golf balls according to the invention may incorporate cores comprising grafted metallocene catalyzed polymers or polymer blends, non-grafted metallocene catalyzed polymers or polymer blends, or conventional materials. Cores comprising at least one grafted metallocene catalyzed polymer or polymer blend may be either one-piece, comprising a single piece of foamed or unfoamed grafted metallocene catalyzed polymer or polymer blend, or multi-piece, comprising a liquid or solid core or center and one or more layers in which any of the center or at least one of the layers comprises a foamed or unfoamed grafted metallocene catalyzed polymer or polymer blend.

For example, FIG. 1 illustrates a golf ball according to the invention with a one-piece core. Golf ball 1 comprises a core 2 and a cover 3, wherein either of core 2 or cover 3 incorporates at least one layer comprising a foamed or unfoamed grafted metallocene catalyzed blend.

Figure 2:
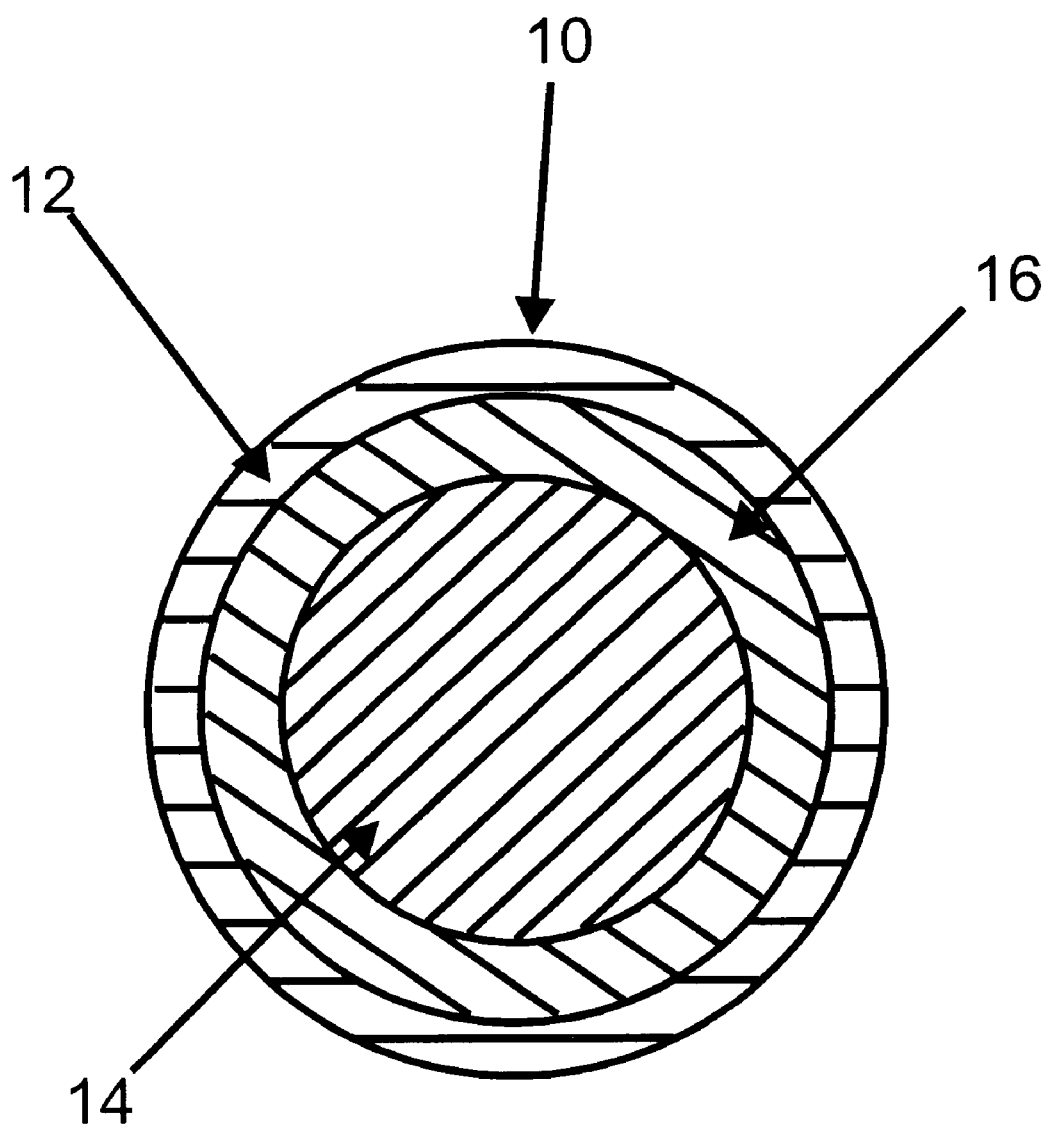
FIG. 2 is a cross-sectional view of a golf ball according to the invention incorporating a multi-layer core.

Similarly, FIG. 2 illustrates a golf ball according to the invention incorporating a multi-piece core. Golf ball 10 comprises a cover 12, a core having a center 14 and at least one additional core layer 16. Any of the cover 12, center 14, or core layer 16 may incorporate at least one layer of a foamed or unfoamed grafted metallocene catalyzed blend.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene. Crosslinking agents include metal salts of unsaturated fatty acids, such as zinc or magnesium salts acrylic or methacrylic acid. The filler typically includes materials such as zinc oxide, barium sulfate, silica, calcium carbonate, zinc carbonate and the like. Golf balls of the invention may also have conventional wound cores.

Figure 3:
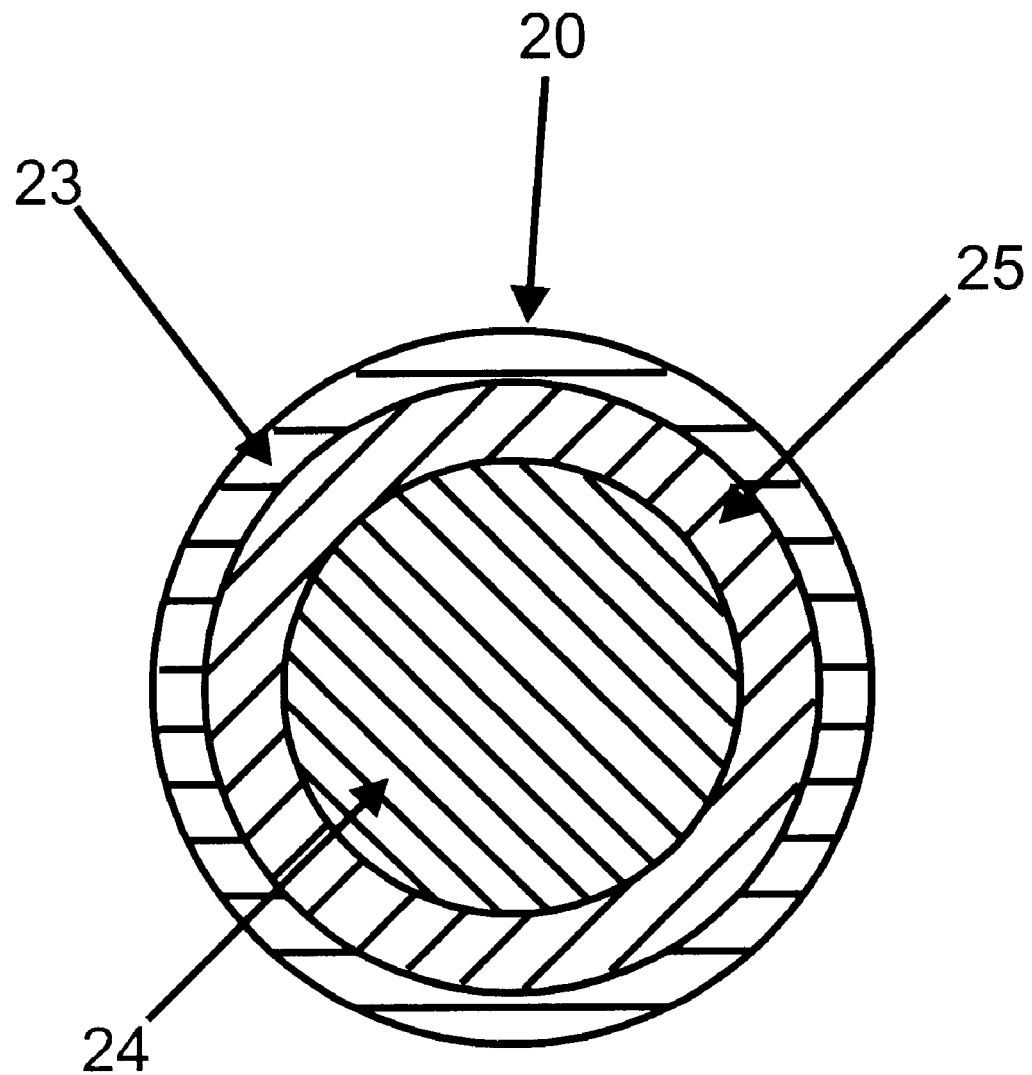
FIG. 3 is a cross-sectional view of a golf ball according to the invention incorporating a mantle layer between the cover and the core.

Golf balls of the invention may also include a mantle layer situated between the cover and the core. Preferably, the mantle layer comprises a least one layer of a foamed or unfoamed grafted metallocene catalyzed polymer or polymer blend, but may also be formed from a non-grafted metallocene catalyzed polymer or polymer blend or from any other suitable polymeric material having the desired properties. A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least one layer of a foamed or unfoamed grafted metallocene catalyzed polymer or polymer blend. Moreover, core 24 may be a one-piece core, a multi-layer core, or a wound core, having a solid or liquid center.

Golf balls according to the invention may also incorporate cover layers comprising foamed or unfoamed grafted metallocene catalyzed polymers or polymer blends, non-grafted metallocene catalyzed polymers or polymer blends, or conventional materials, including balata and ionomer cover stock. Grafted metallocene catalyzed polymer blend cover layers according to the invention may be used with conventional solid or wound cores, as well as those comprising grafted or non-grafted metallocene catalyzed polymers or polymer blends. Preferably, the cover of a golf ball according to the invention is formed from a blend comprising at least one grafted metallocene catalyzed polymer and at least one ionomer.

The narrow molecular weight distributions of metallocene catalyzed polymers provide more uniform compositions and improved mechanical properties when compared to polyolefins polymerized with conventional catalysts. In addition, when the metallocene catalyzed polymer is modified by a post-polymerization reaction to add at least one pendant functional group to the metallocene catalyzed polymer, the compatibility of the resulting grafted metallocene catalyzed polymer with other polymers, and with ionomers in particular, is improved. As a result, blends of grafted metallocene catalyzed polymers and ionomers have superior golf ball properties, including performance and durability. For example, as demonstrated in the examples below, a compatible blend of a grafted metallocene catalyzed polymer and an ionomer results in a golf ball cover composition that provides a higher initial velocity for a given cover hardness, when compared to covers comprising a blend of a non-grafted metallocene catalyzed polymer and an ionomer.

When a layer of foamed or unfoamed metallocene catalyzed polymer or polymer blend is used in a golf ball cover or mantle, the ball has a softer feel than balls using a hard ionomer, and is more deformable. The increased deformation of the cover and outer layers of the ball provides improved control due to the increased "bite" on the clubface when the ball is struck, which prevents or reduces sliding of the ball up the clubface, and allows more energy to be imparted directly to the core at impact, providing a greater initial velocity. The improved control and feel are similar to those obtained using a soft balata cover without the decrease in durability that is typically associated with balata. Moreover, when the layer in the cover or the mantle comprises a grafted metallocene catalyzed polymer or polymer blend, the performance of the resulting golf ball, in particular, the initial velocity, is also significantly improved.

The use of foamed grafted metallocene catalyzed polymer also allows the golf ball designer to adjust the density or mass distribution of the ball to adjust the angular moment of inertia, and, thus, the spin rate and performance of the ball. Foamed materials also offer a potential cost savings due to the reduced use of polymeric material.

Grafted metallocene catalyzed polymers useful in the golf balls of the invention are available in experimental quantities from DuPont, or may be obtained by subjecting a non-grafted metallocene catalyzed polymer to a post-polymerization reaction to provide a grafted metallocene catalyzed polymer with the desired pendant group or groups. Examples of metallocene catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene, and most preferably, butene, pentene, hexene, heptene, octene, and norbornene. Generally, the invention includes golf balls having at least one layer comprising at least one grafted metallocene catalyzed polymer or polymer blend, where the grafted metallocene catalyzed polymer is produced by grafting a functional group onto a metallocene catalyzed polymer having the formula:

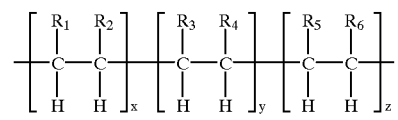

wherein $R_1$ is hydrogen, branched or straight chain alkyl such as methyl, ethyl, propyl, butyl, pentyl, hexyl, heptyl, and octyl, carbocyclic, aromatic or heterocyclic;

$R_2$ is hydrogen, lower alkyl including $C_1$–$C_5$; carbocyclic, aromatic or heterocyclic $R_3$ is hydrogen, lower alkyl including $C_1$–$C_5$, carbocyclic, aromatic or heterocyclic;

$R_4$ is selected from the group consisting of H, $C_nH_{2n+1}$, where n=1 to 18, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;

$R_5$ is hydrogen, lower alkyl including $C_1$–$C_5$, carbocyclic, aromatic or heterocyclic;

$R_6$ is hydrogen, lower alkyl including $C_1$–$C_5$, carbocyclic, aromatic or heterocyclic; and wherein x, y and z are the relative percentages of each co-monomer. The number x can range from 1–99 percent or more preferably from 10–70 percent and most preferred, from about 10–50 percent. The number y can be from 99–1 percent, preferably, from 90–30 percent, or most preferably, 90–50 percent. The number z can range from 0 to 49 percent.

Preferably, the preferred grafted metallocene catalyzed polymer is formed by grafting a functional group onto a metallocene catalyzed polyethylene or a metallocene catalyzed polymer of the formula given above in which $R_1$ is hydrogen or lower alkenyl, $R_2$ is hydrogen or alkyl, including carbon chains having from 1 to 10 carbon atoms, $R_3$ is hydrogen or lower alkyl or alkenyl such as carbon chains having 1–10 carbon atoms, and $R_4$ is a lower alkyl group having from 1–10 carbon atoms. For terpolymers, where z is not zero, $R_5$ is preferably hydrogen or lower alkyl or alkenyl such as carbon chains having 1–10 carbon atoms, and $R_6$ is a lower alkyl group having from 1–10 carbon atoms. In the most preferred copolymer, $R_1$ and $R_2$ are hydrogen, $R_3$ is hydrogen, methyl, ethyl, propyl, butyl, pentyl, hexyl, heptyl or octyl, and $R_4$ is a straight carbon chain having 6 carbon atoms. For terpolymers, $R_5$ is most preferably hydrogen, methyl, ethyl, propyl, butyl, pentyl, hexyl, heptyl or octyl, and $R_6$ is a straight carbon chain having 6 carbon atoms.

Metallocene catalyzed copolymers or terpolymers can be random or block copolymers or terpolymers, and may be isotactic, syndotactic or atactic. The pendant groups creating the isotactic, syndiotactic or atactic polymers are chosen to determine the interactions between the different polymer chains making up the resin to control the final properties of the resins used in golf ball covers, cores, or mantles. As will be clear to those skilled in the art, grafted metallocene catalyzed polymers useful in the invention that are formed from metallocene catalyzed random or block copolymers or terpolymers will also be random or block copolymers or terpolymers, and will have the same tacticity of the metallocene catalyzed polymer backbone.

As used herein, the phrase branched or straight chain alkyl means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, substituted and unsubstituted carbocyclic means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, substituted and unsubstituted aryl groups means a hydrocarbon ring bearing a system of conjugated double bonds, typically comprising $4n+2\pi$ (pi) ring electrons, where n is an integer. Examples of aryl groups include, but are not limited to phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl.

Non-grafted metallocene catalyzed polymers useful in the present invention are commercially available under the trade name AFFINITY® polyolefin plastomers and ENGAGE® polyolefin elastomers by Dow Chemical Company and DuPont-Dow. Other commercially available metallocene catalyzed polymers can be used such as Exxon's Exact® and Dow's Insight® line of resins which have superior flexibility and clarity as well as toughness. The Exact® and Insight® line of polymers also have novel rheological behavior in addition to their other properties as a result of using a metallocene catalyst technology. Metallocene catalyzed polymers are also available from Sentinel Products Corporation of Hyannis, Mass., as foamed sheets for compression molding. The foamed grafted metallocene catalyzed polymers sheets are available in thicknesses ranging from about 0.027 to 0.625 inches (0.069 to 0.159 cm). Closed cell bun stock is also available in thicknesses of up to 4 inches (10.2 cm).

Grafted metallocene catalyzed polymers, functionalized with pendant groups, such as maleic anhydride, and the like, are available in experimental quantities from DuPont.

In addition, grafted metallocene catalyzed polymers may be formed from commercially available metallocene catalyzed polymers using post-polymerization reactions known in the art. For example, the grafted metallocene catalyzed polymers may be formed using the method disclosed in EPA 0 266 994 by admixing a metallocene catalyzed polymer with a monomer capable of bonding to the metallocene catalyzed polymer and an organic peroxide, and mixing the admixture at a temperature greater than the melting point of the metallocene catalyzed polymer for a time sufficient for the post-polymerization reaction to occur. Typically, the mixing is continued for at least four times the half-life of the organic peroxide. Although the monomer, metallocene catalyzed polymer, and the peroxide may be added in any order, preferably, the metallocene catalyzed polymer and monomer are thoroughly mixed before the peroxide is added.

Monomers useful in the present invention include, but are not limited to olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester derivatized mono-carboxylic acids and dicarboxylic acids, and anhydrides of dicarboxylic acids, and cyclic imides of dicarboxylic acids. In polyethylene, the post-polymerization reaction results in the substitution of the monomer for a hydrogen on the polymer backbone. Because all of the secondary hydrogen atoms are equivalent in polyethylene, the pendant group may replace any of the secondary hydrogens on the polymer. In copolymers and polymers of olefins other than ethylene, which contain both secondary and tertiary hydrogens, the tertiary hydrogens are more labile, and, thus, the reaction occurs substantially exclusively at the site of the tertiary hydrogens.

In addition, metallocene catalyzed polymers may also be functionalized by sulfonation, carboxylation, or the addition of an amine or hydroxy group. Metallocene catalyzed polymers functionalized by sulfonation, carboxylation, or the addition of a hydroxy group may be converted to anionic ionomers by treatment with a base. Similarly, metallocene catalyzed polymers functionalized by the addition of an amine may be converted to cationic ionomers by treatment with an alkyl halide, acid, or acid derivative.

The most preferred monomer is maleic anhydride, which, once attached to the metallocene catalyzed polymer by the post-polymerization reaction, may be further subjected to any reaction to which an anhydride may be subject to form a grafted metallocene catalyzed polymer containing other pendant or functional groups. For example, reaction with water will convert the anhydride to a dicarboxylic acid, reaction with ammonia forms an amide, reaction with an alcohol results in the formation of an ester, and reaction with base results in the formation of an anionic ionomer.

In particular, maleic anhydride, which has the formula

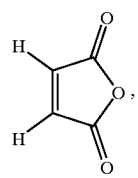

may be grafted onto a metallocene-catalyzed polymer by means of a post-polymerization reaction, as described above. The maleic anhydride will graft onto a metallocene catalyzed polymer of formula

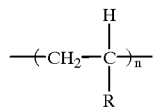

to form a grafted metallocene catalyzed polymer of formula

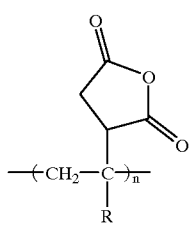

Where R is not H, the monomer being grafted to the metallocene catalyzed polymer will always replace the tertiary H because the tertiary H is more labile than the secondary H. Clearly, in polyethylene, where every H is a secondary H, the monomer must replace a secondary H. Where the monomer is a maleic anhydride, the resulting grafted metallocene catalyzed polymer may be reacted with water to form

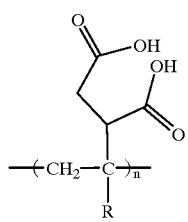

which may be further reacted with a base of formula $M^+OH^-$ to form an ionomer of formula

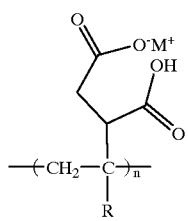

formula

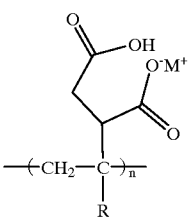

or formula

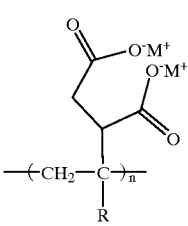

or reacted with a base of formula $M^{2+}(OH^-)_2$ to form an ionomer of formula

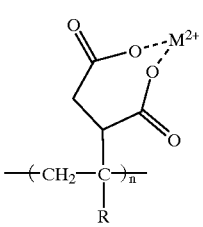

A maleic anhydride grafted metallocene catalyzed polymer may also be reacted with ammonia to form

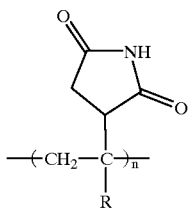

It has been discovered that maleic anhydride grafted metallocene catalyzed polymers are formed of highly compatible blends with ionomers and other thermoplastic polymers.

In addition, unsaturated carboxylic acids, such as methacrylic and acrylic acid, can be grafted to a metallocene catalyzed polymer to form

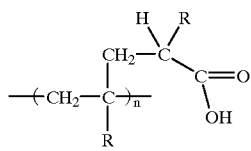

which may be reacted with a base to form an ionomer. Sulfur compounds, such as $H_2SO_4$, $ClSO_3H$, or $SO_3$, when grafted to a metallocene catalyzed polymer will form polymers of formula

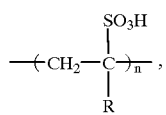

Grafting a vinyl ester of formula $CH_2=CH—COOR$ gives polymers of formula

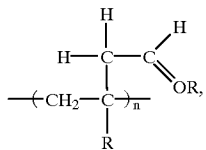

and a primary or secondary amine or other suitable nitrogen compound provides polymers of formula

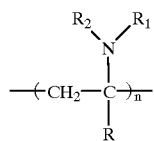

If a monomer of formula

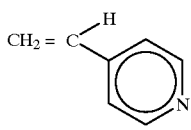

is used, the resulting grafted metallocene catalyzed polymer of formula

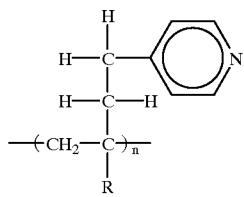

may be reacted with an acid or acid derivative or a compound of formula $R^+X^-$, where R may be a linear or branched alkyl group having from 1 to 12 carbon atoms, and X may be a halide, to form a cationic ionomer.

The grafted metallocene catalyzed polymer blend golf ball compositions of the present invention comprise compatible blends of at least one grafted metallocene catalyzed polymer and at least one ionomer or other thermoplastic elastomer. Blends useful in the golf ball of the invention may be formed using blending methods well known in the art. In particular, the grafted metallocene catalyzed polymer blends comprise compatible blends of grafted metallocene catalyzed polymers and ionomers, such as ethylene methacrylic acid ionomers, and ethylene acrylic acid ionomers, and their terpolymers, sold commercially under the trade names SURLYN® and IOTEK® by DuPont and Exxon respectively.

The grafted metallocene catalyzed polymers useful in the golf balls of the invention can also be blended with non-grafted metallocene catalyzed polymers and other non-ionomeric polymers, such as poly(ethylethylene), poly(heptylethylene), poly(hexyldecylethylene), poly(isopentylethylene), poly(1,1-dimethyltrimethylene), poly(1,1,2-trimethyltrimethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly[1,1-bis(trifluoromethoxy)difluoroethylene], poly(methoxyethylene), poly(pentyloxyethylene), poly(1,1-dichloroethylene), poly(cyclopentylacetoxyethylene), poly(4-[(2-butoxyethoxy)methyl]styrene), poly(4-dodecylstyrene), poly(4-tetradecylstyrene), poly(phenetylmethylethylene), poly[oxy(allyloxymethyl)ethylene], poly[oxy(ethoxymethyl)ethylene], poly(oxyethylethylene), poly(oxytetramethylene), poly(oxytrimethylene), poly(oxycarbonylpentamethylene), poly(oxycarbonyl-3-methylpentamethylene), poly(oxycarbonyl-1,5-dimethylpentamethylene), poly(oxy-2,2,3,3,4,4-hexafluoropentamethyleneoxyadipoyl), poly[oxy(methyl)-3,3,3-trifluoropropylsilylene-3p3-difluoropentamethylene(methyl)-3,3,3-trifluoropropylsilylene], poly(silanes) and poly(silazanes), main-chain heterocyclic polymers, polyamides, polyimides, polyesters, polyethers, polycarbonates, and poly(furan tetracarboxylic acid diimides) as well as the classes of polymers to which they belong.

The preferred golf ball compositions comprise one or more ionomer resins having a flexural modulus of from about 50 psi to about 150,000 psi and a grafted metallocene catalyzed copolymer of an olefin having a flexural modulus of from about 500 psi to 200,000 psi. In a most preferred embodiment of the present invention EXACT® 4033-MA or Engage® 8180-MA is combined with SURLYN® 8320 or SURLYN® 7940 to form combination blends suitable for use in golf ball centers and cover, core, and mantle layers.

The amounts of polymers used in the golf ball compositions of the invention can vary from 1 to 100 phr of the grafted metallocene catalyzed polymers to 99 to 0 phr of other polymers or ionomers, preferably, 5 to 75 phr grafted metallocene catalyzed polymers and 95 to 25 phr ionomer or other polymer. Most preferred is from about 10 to 50 phr grafted metallocene catalyzed polymer and from about 90 to 50 phr of other polymer or ionomer.

Further compositions may also be added to the compatible blends of the invention, such as, for example, coloring agents, reaction enhancers, crosslinking agents, dyes, lubricants, fillers, excipients, process aids and other compounds commonly added to polymeric materials and/or golf ball covers.

The present invention relates to golf balls of any size. While USGA specifications limit the size of a competition golf ball to more than 1.68 inches (4.27 cm) in diameter, golf balls of any size can be used for leisure golf play. The preferred diameter of the golf balls is from about 1.68 inches to about 1.8 inches (4.57 cm). The more preferred diameter is from about 1.68 inches to about 1.76 inches (4.47 cm). A diameter of from about 1.68 inches to about 1.74 inches (4.42 cm) is most preferred, however diameters anywhere in the range of from 1.7 to about 1.95 inches (4.3 to 4.95 cm) can be used.

Grafted metallocene catalyzed polymer blend layers may be produced in golf balls in accordance with the present invention by injection molding or compression molding a layer of grafted metallocene catalyzed polymer blend material about a previously formed center or core, cover, or mantle layer. Cores comprising a grafted metallocene catalyzed polymer blend may also be formed directly by injection molding or compression molding. When the layer or core is injection molded, a physical or chemical blowing or foaming agent may be included to produce a foamed layer. Blowing or foaming agents useful in forming foamed grafted metallocene catalyzed polymer blends include, but are not limited to organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonylhydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the blend during the injection molding process.

In a further embodiment, foamed grafted metallocene catalyzed polymer blends may be formed by blending microspheres with the grafted metallocene catalyzed polymer blend either during or before the molding process. Polymeric, ceramic, metal, and glass microspheres are useful in the invention, and may be solid or hollow and filled or unfilled. Microspheres up to about 1,000 micrometers in diameter are useful in the grafted metallocene catalyzed polymer blends of the invention.

For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250 to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

After the final cover layer of the ball has been molded, the ball undergoes various conventional finishing operations such as buffing, painting and stamping.

Blending of the grafted metallocene catalyzed polymer and ionomer resins is accomplished in a conventional manner using conventional equipment. Good results have been obtained by mixing the grafted metallocene catalyzed polymer and ionomer resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding or for molding flowable grafted metallocene catalyzed polymer blend using a retractable-pin mold. Such machines are conventional.

These and other aspects of the present invention may be more fully understood by reference to the following examples. While these examples are meant to be illustrative of golf balls made according to the present invention, the present invention is not meant to be limited by the following examples. All parts are by weight unless otherwise specified.

As shown in Table 1, batches of 10 to 15 dozen golf balls were prepared having covers incorporating blends of Surlyn 7940, a copolymer of ethylene and about 14 to about 16 percent methacrylic acid, having about 30 to about 60 percent of the acid groups neutralized with lithium and a Shore D hardness of about 68, blended with one of Exact 4033-MA, a maleic anhydride grafted ethylene-butene metallocene catalyzed polymer, Engage 8180-MA, a maleic anhydride grafted ethylene-octene metallocene catalyzed polymer, Exact 4049 an unfunctionalized ethylene-butene metallocene catalyzed polymer, Engage 8180, an unfunctionalized ethylene-octene metallocene catalyzed polymer, and Surlyn 8320, a very low modulus ionomer ("VLMI"), i.e., a terpolymer of ethylene, 8 to 11 percent methacrylic acid, and n-butyl acrylate, having about 40 to about 60 percent of the acid groups neutralized with sodium and a Shore D hardness of about 35.

As is clearly shown in Table 1, golf balls in accordance with the invention, i.e., golf balls incorporating blends comprising maleic anhydride functionalized metallocene catalyzed polymers, have an initial velocity that is typically significantly better than that of golf balls having covers comprising VLMI or unfunctionalized metallocene catalyzed polymers in an amount equivalent to that of the maleic anhydride functionalized metallocene catalyzed polymers used in the examples. Moreover, the results shown in Table 1 demonstrate that golf balls in accordance with the present invention provide performance that is at least as good, if not superior to golf balls having ionomer blend covers, while having a softer cover, which provides a softer "feel". Although the compression of each of the golf balls of the invention exemplified in Table 1 is relatively low, i.e., having a PGA compression in the range of 88 to 92, which corresponds to a Riehle compression in the range of 72 to 68, the coefficient of restitution of the golf balls of the invention is at least as high, and, in many cases, significantly better than that of the high compression balls incorporating maleic anhydride modified polymers as disclosed in the Sullivan patents described above. Moreover, tests have shown that the golf balls of the invention are also far more durable than golf balls comprising ionomers blended with polymers formed using catalysts other than metallocenes, such as those disclosed in the Sullivan patents.

TABLE 1

EFFECT OF MALEIC ANHYDRIDE GRAFTED METALLOCENE COVER BLENDS ON BALL PROPERTIES

| Ingredients | #1 | #2 | #3 | #4 | #5 | #6 | #7 | #8 | #9 | #10 | #11 | #12 | #13 |
|---|---|---|---|---|---|---|---|---|---|---|---|---|---|
| Surlyn 7940 | 80.95 | 66.67 | 52.38 | 80.95 | 66.67 | 52.38 | 80.95 | 66.67 | 80.95 | 66.67 | 80.95 | 66.67 | 52.38 |
| Exact 4033-MA | 14.29 | 28.57 | 42.86 | | | | | | | | | | |
| Exact 4049 | | | | 14.29 | 28.57 | 42.86 | | | | | | | |
| Engage 8180-MA | | | | | | | 14.29 | 28.57 | | | | | |
| ENGAGE 8180 | | | | | | | | | 14.29 | 28.57 | | | |
| SURLYN 8320 | | | | | | | | | | | 14.29 | 28.57 | 42.86 |
| TiO$_2$ concentrate | 4.76 | 4.76 | 4.76 | 4.76 | 4.76 | 4.76 | 4.76 | 4.76 | 4.76 | 4.76 | 4.76 | 4.76 | 4.76 |
| Ball Properties | | | | | | | | | | | | | |
| Compression | 92 | 91 | 88 | 92 | 89 | 86 | 92 | 89 | 90 | 87 | 93 | 90 | 89 |
| HARDNESS (Shore-D) | 64 | 60 | 54 | 64 | 58 | 53 | 64 | 58 | 62 | 57 | 67 | 62 | 58 |
| Initial velocity (ft/sec) | 252.5 | 252.2 | 251.6 | 252.1 | 252.0 | 251.6 | 252.2 | 251.9 | 251.9 | 251.7 | 252.2 | 251.3 | 250.8 |
| COR @ 125 Ft/Sec | 0.807 | 0.802 | 0.796 | 0.803 | 0.800 | 0.796 | 0.805 | 0.798 | 0.802 | 0.797 | 0.803 | 0.797 | 0.792 |

Note:
Surlyn 7940 is a copolymer of ethylene and methacrylic acid partially neutralized with Li ion
Exact 4033-MA is a maleic anhydride grafted ethylene-butene metallocene catalyzed copolymer
Engage 8180-MA is a maleic anhydride grafted ethylene-octene metallocene catalyzed copolymer
Exact 4049 is an unfunctionalized ethylene-butene metallocene catalyzed copolymer
Engage 8180 is an unfunctionalized ethylene-octene metallocene catalyzed copolymer
Surlyn 8320 is a terpolymer of ethylene and methacrylic acid and n-butyl acrylate partially neutralized with Na ion
TiO$_2$ concentrate is TiO$_2$ dispersed in Surlyn carrier resin containing 9–11% MAA partially neutralized with Na ion.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A golf ball having at least one layer, the layer formed from a composition comprising at least one metallocene catalyzed polymer that has been functionalized by sulfonation, carboxylation, addition of an amine or hydroxy, or by grafting an ethylenically unsaturated monomer onto the at least one metallocene catalyzed polymer using a post-polymerization reaction.

2. The golf ball of claim 1, wherein the ethylenically unsaturated monomer is an olefinic monomer having a functional group selected from the group consisting of sulfonic acid, sulfonic acid derivatives, chlorosulfonic acid, vinyl ethers, vinyl esters, primary amines, secondary amines, tertiary amines, mono-carboxylic acids, dicarboxylic acids, partially or fully ester derivatized mono-carboxylic acids, partially or fully ester derivatized dicarboxylic acids, anhydrides of dicarboxylic acids, cyclic imides of dicarboxylic acids, and ionomeric derivatives thereof.

3. The golf ball of claim 2, wherein the ethylenically unsaturated monomer is maleic anhydride.

4. The golf ball of claim 1, wherein the composition comprises a blend of at least one grafted metallocene catalyzed polymer and at least one of an ionomer, a non-grafted metallocene catalyzed polymer, or a non-ionomeric polymer.

5. The golf ball of claim 1, wherein the composition comprises a blend of at least one grafted metallocene catalyzed polymer and at least one ionomer.

6. The golf ball of claim 5, wherein the at least one grafted metallocene catalyzed polymer is present in an amount of from about 10 to about 75 phr and the ionomer is present in an amount of from about 90 to about 25 phr.

7. The golf ball according to claim 1, comprising a cover, wherein the layer forms at least a portion of the cover.

8. The golf ball according to claim 7, wherein the cover layer has a foamed structure.

9. The golf ball according to claim 7, wherein the cover layer has a Shore D hardness of from about 15 to about 80.

10. The golf ball according to claim 7, wherein the cover layer has a thickness of from about 0.005 to about 0.125 inch.

11. The golf ball according to claim 1, comprising a core, wherein the layer forms at least a portion of the core.

12. The golf ball according to claim 11, wherein the core comprises a liquid center.

13. The golf ball according to claim 11, wherein the core layer has a foamed structure.

14. The golf ball according to claim 11, wherein the core layer has a Shore D hardness of from about 15 to about 80.

15. The golf ball according to claim 11, wherein the core has a diameter of from about 1.0 to about 1.63 inch, and the core layer has a thickness of from about 0.005 to about 0.125 inch.

16. The golf ball according to claim 1, further comprising a cover and a core and a mantle situated between the cover and the core.

17. The golf ball according to claim 16, wherein the core comprises a liquid or solid center wrapped in elastomeric windings.

18. The golf ball according to claim 16, wherein the layer forms at least a portion of the mantle.

19. The golf ball according to claim 18, wherein the core has a diameter of from about 1 to about 1.63 inch, the cover has a thickness of from about 0.005 to about 0.125 inch, and the mantle has a thickness of from about 0.005 to about 0.125 inch.

20. The golf ball according to claim 18, wherein the layer has a foamed structure.

21. The golf ball according to claim 18, wherein the layer has a Shore D hardness of from about 15 to about 80.

22. The golf ball according to claim 1, wherein the grafted metallocene catalyzed polymer is formed by grafting an ethylenically unsaturated monomer onto a metallocene catalyzed polymer selected from the group consisting of polyethylene and copolymers of ethylene with propylene, butene, pentene, hexene, heptene, octene, and norbornene.

23. The golf ball according to claim 1, wherein the grafted metallocene catalyzed polymer is formed by grafting an ethylenically unsaturated monomer onto a metallocene catalyzed polymer of the formula:

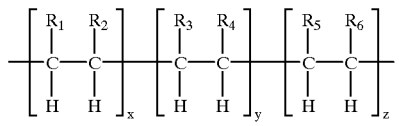

wherein
$R_1$ is hydrogen;
$R_2$ is hydrogen or lower alkyl selected from the group consisting of $CH_3$, $C_2H_5$, $C_3H_7$, $C_4H_9$, and $C_5H_{11}$;
$R_3$ is hydrogen or lower alkyl selected from the group consisting of $CH_3$, $C_2H_5$, $C_3H_7$, $C_4H_9$, and $C_5H_{11}$;
$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be replaced by substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;
$R_5$ is hydrogen, lower alkyl, carbocyclic, aromatic or heterocyclic;
$R_6$ is hydrogen, lower alkyl, carbocyclic, aromatic or heterocyclic; and
wherein x ranges from 99 to 50 weight percent of the polymer, y ranges from 1 to 50 weight percent of the polymer and z ranges from 0 to 49 weight percent of the polymer.

24. The golf ball according to claim 1, wherein the grafted metallocene catalyzed polymer has a flexural modulus of from about 500 psi to 200,000 psi, and is blended with an ionomer having a flexural modulus of from about 50 psi to about 150,000 psi.

25. The golf ball according to claim 1, wherein the grafted metallocene catalyzed polymer has a foamed structure, and, further wherein the grafted metallocene catalyzed polymer has a flexural modulus of from about 1,000 to about 150,000 psi.

26. The golf ball according to claim 1, further comprising a cover and a core, wherein the grafted metallocene catalyzed polymer blend has a foamed structure.

27. The golf ball according to claim 26, wherein the layer forms at least a portion of the core, and the cover comprises a density increasing filler material.

28. The golf ball according to claim 26, wherein the layer forms at least a portion of the cover, and the core comprises a density increasing filler material.

29. The golf ball according to claim 26, further comprising a mantle situated between the cover and the core, wherein the layer forms at least a portion of the mantle, and either the cover or the core comprises a density increasing filler material.

30. A golf ball comprising a cover and a core and a mantle situated between the cover and the core, wherein at least one of the cover, the core, and the mantle comprises at least one layer, the layer formed of a grafted metallocene catalyzed polymer blend, comprising from about 1 to about 100 phr of at least one grafted metallocene catalyzed polymer and from about 99 to 0 phr of at least one ionomer.

31. The golf ball according to claim 30, wherein the at least one layer has a foamed structure.

32. The golf ball according to claim 30, wherein the grafted metallocene catalyzed polymer is formed by grafting an ethylenically unsaturated monomer onto a metallocene catalyzed polymer selected from the group consisting of copolymers of ethylene with butene, hexene, octene, and norbornene.

33. The golf ball according to claim 30, wherein the grafted metallocene catalyzed polymer is formed by grafting an ethylenically unsaturated monomer onto a metallocene catalyzed polymer of the formula:

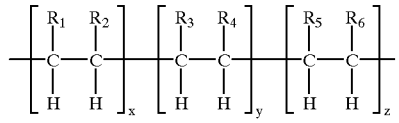

wherein
$R_1$ is hydrogen;
$R_2$ is hydrogen or lower alkyl selected from the group consisting of $CH_3$, $C_2H_5$, $C_3H_7$, $C_4H_9$, and $C_5H_{11}$;
$R_3$ is hydrogen or lower alkyl selected from the group consisting of $CH_3$, $C_2H_5$, $C_3H_7$, $C_4H_9$, and $C_5H_{11}$;
$R_4$ is selected from the group consisting of H, $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, and phenyl, in which from 0 to 5 H within $R_4$ can be substituents selected from the group consisting of COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring;
$R_5$ is hydrogen, lower alkyl, carbocyclic, aromatic or heterocyclic;
$R_6$ is hydrogen, lower alkyl, carbocyclic, aromatic or heterocyclic; and
wherein x ranges from 99 to 50 weight percent of the polymer, y ranges from 1 to 50 weight percent of the polymer and z ranges from 0 to 49 weight percent of the polymer.

* * * * *

UNITED STATES PATENT AND TRADEMARK OFFICE
CERTIFICATE OF CORRECTION

PATENT NO. : 5,981,658

DATED : November 9, 1999

INVENTOR(S) : Murali Rajagopalan *and* Kevin M. Harris

It is certified that error appears in the above-identified patent and that said Letters Patent is hereby corrected as shown below:

At column 20, line 42, in claim 33, change "can be substituents" to
--can be replaced by substituents--.

Signed and Sealed this

Thirtieth Day of May, 2000

*Attest:*

Q. TODD DICKINSON

*Attesting Officer*     *Director of Patents and Trademarks*